United States Patent
Starr et al.

(10) Patent No.: US 7,899,452 B2
(45) Date of Patent: Mar. 1, 2011

(54) METHODS AND SYSTEMS FOR PROVIDING A PROXY SERVICE

(75) Inventors: Robert J. Starr, Decatur, GA (US); Samuel Zellner, Dunwoody, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 465 days.

(21) Appl. No.: 11/301,915

(22) Filed: Dec. 13, 2005

(65) Prior Publication Data

US 2007/0136460 A1 Jun. 14, 2007

(51) Int. Cl.
*H04W 4/00* (2009.01)
*H04W 24/00* (2009.01)

(52) U.S. Cl. .................. 455/431; 455/456.1; 455/456.4; 455/456.5

(58) Field of Classification Search .............. 455/432.1, 455/456.1, 456.4, 456.5, 431
See application file for complete search history.

(56) References Cited

U.S. PATENT DOCUMENTS

| | | | | |
|---|---|---|---|---|
| 5,950,129 | A * | 9/1999 | Schmid et al. | 455/431 |
| 6,321,084 | B1 * | 11/2001 | Horrer | 455/431 |
| 7,113,780 | B2 * | 9/2006 | McKenna et al. | 455/431 |
| 2007/0117595 | A1 * | 5/2007 | Sherman | 455/567 |
| 2007/0135134 | A1 * | 6/2007 | Patrick | 455/456.1 |

OTHER PUBLICATIONS

Hassan A. Karimi et al., "Telegeoinformatics: Location-based Computing and Services,"(Hardcover—Mar. 15, 2004).

* cited by examiner

*Primary Examiner*—Un C Cho
*Assistant Examiner*—George Eng
(74) *Attorney, Agent, or Firm*—Larson Newman & Abel, LLP

(57) ABSTRACT

Systems and methods are disclosed for providing a location proxy. The disclosed systems and methods include associating a user device with a confining area. Furthermore, the disclosed systems and methods include reporting the location of a proxy device corresponding to the confining area as the location of the user device. Moreover, the disclosed systems and methods include disassociating the user device from the confining area. Furthermore, the disclosed systems may determine if a first condition associated with a user device is present wherein the first condition comprises the user device being unable to determine a location of the user device or the user device being unable to communicate over a communication system associated with the user device. In addition, the disclosed systems may use a proxy device to determine the location of the user device, report the location of the user device, or to allow the user device to communicate.

19 Claims, 4 Drawing Sheets

METHODS AND SYSTEMS FOR PROVIDING A PROXY SERVICE

BACKGROUND OF THE INVENTION

I. Field of the Invention

The present invention generally relates to methods and systems for providing a proxy service. More particularly, the present invention relates to providing a location proxy in which, for example, a proxy device may be in motion.

II. Background Information

Electronic devices, such as personal digital assistants (PDAs), laptop computers, and cellular telephones, are pervasive and provide very useful functionality. Many of these devices, for example, can directly report the device's location. In some situations, for safety reasons, data from cellular telephones including location information may not be transmitted from the cellular telephone when the device's user is confined in a particular area. For example, location information from cellular telephones may not be transmitted from the cellular telephone on a commercial airliner in flight because the cellular telephone is required to be off. Thus, the conventional strategy is to require users, even under penalty of law, to shut off many types of electronic devices, including cellular telephones, when a user is confined in a particular area. This often causes problems because the conventional strategy does not allow location information to be provided from a device when the device's user is confined in particular area.

In view of the foregoing, there is a need for methods and systems for providing a location proxy more optimally. Furthermore, there is a need for providing a location proxy in which, for example, a proxy device may be in motion.

SUMMARY OF THE INVENTION

Consistent with embodiments of the present invention, systems and methods are disclosed for providing a location proxy. In accordance with one embodiment, a method for providing a proxy service may comprise determining if a first condition associated with a user device is present wherein the first condition comprises one of the following: the user device being unable to determine a location of the user device and the user device being unable to communicate over a communication system associated with the user device and using, if the first condition associated with the user device is present, a proxy device to perform at least one of the following: determine the location of the user device, report the location of the user device, and to allow the user device to communicate.

According to another embodiment, a system for providing a proxy service comprises means for determining if a first condition associated with a user device is present wherein the first condition comprises one of the following: the user device being unable to determine a location of the user device and the user device being unable to communicate over a communication system associated with the user device and means for using, if the first condition associated with the user device is present, a proxy device to perform at least one of the following: determine the location of the user device, report the location of the user device, and to allow the user device to communicate. In accordance with yet another embodiment, a computer-readable medium which stores a set of instructions which when executed performs a method for providing a proxy service, the method executed by the set of instructions comprising determining if a first condition associated with a user device is present wherein the first condition comprises one of the following: the user device being unable to determine a location of the user device and the user device being unable to communicate over a communication system associated with the user device and using, if the first condition associated with the user device is present, a proxy device to perform at least one of the following: determine the location of the user device, report the location of the user device, and to allow the user device to communicate.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
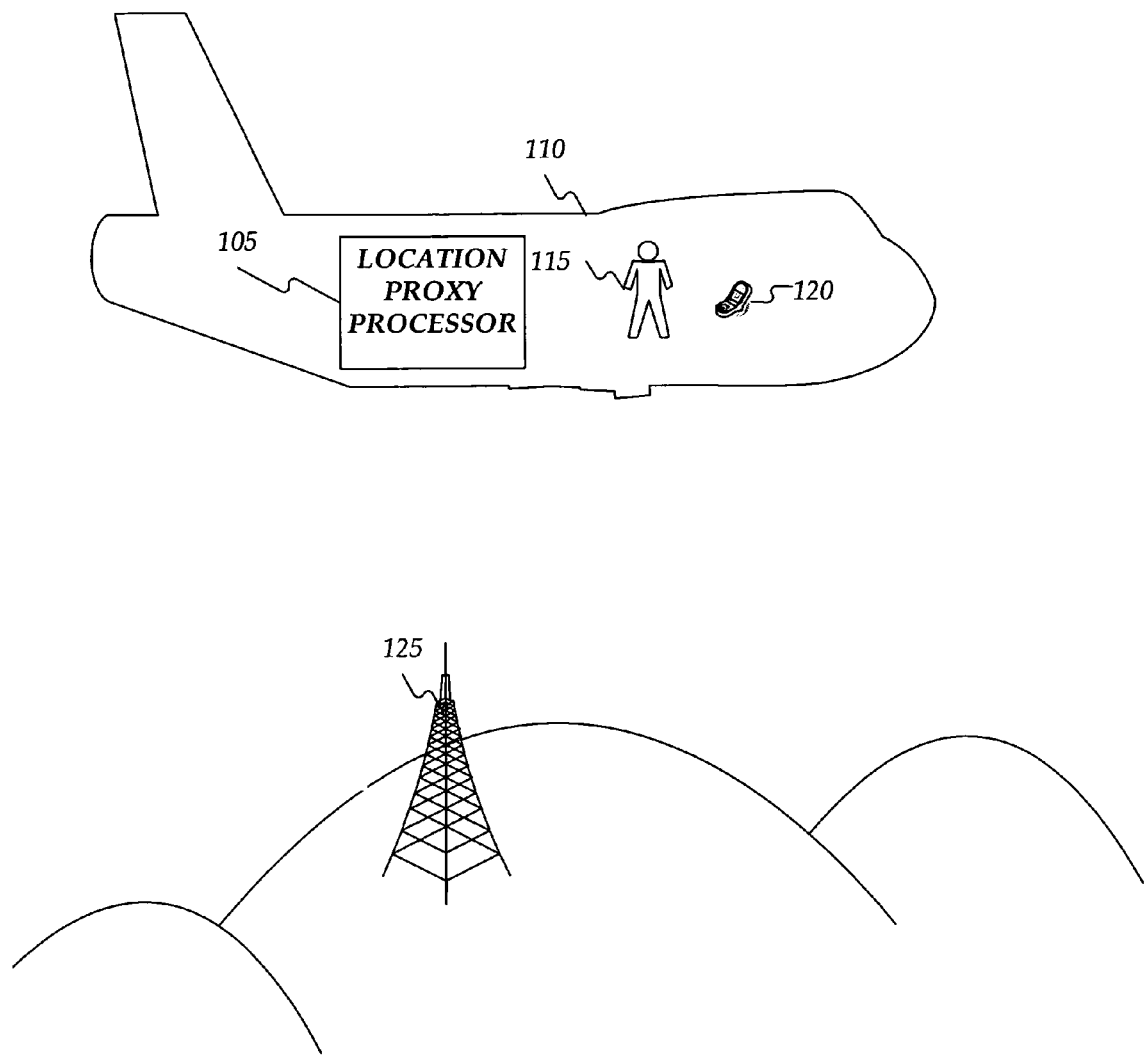
FIG. 1 is a block diagram of an exemplary location proxy system consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding stages to the disclosed methods. Accordingly, the following detailed description does not limit the invention. Instead, the proper scope of the invention is defined by the appended claims.

Systems and methods consistent with embodiments of the present invention provide a location proxy. Consistent with embodiments of the present invention, location proxy services are provided for individual devices when, for example, the individual devices cannot communicate or report their location directly or have been rendered to not communicate or report their location directly. For example, a user may take a location-identifying cellular telephone onto a commercial airline flight. When the airplane takes off, for example, a location proxy device (e.g. an in-motion location proxy device) on the airplane reports the user's location on the plane. Consistent with embodiments of the invention, the individual cellular telephone would not directly report the user's location, but the location proxy device located on the airplane would provide a centralized proxy for the user's location. For example, for safety reasons, individual location information from cellular telephones may not be transmitted from the cellular telephone on the airplane. Instead, the location proxy device itself may be in motion and may report its location as a proxy for the user's location who is essentially contained in some confined area for a time period.

The user's location information may be reported for a number of reasons. For instance, the user's location may be reported on an emergency call to an emergency 911 center. For example, if the user dials 911, the 911 center receives the user's device location. Furthermore, there are other applications for location services. For example, the user may walk by a store and receive an ad from that store in a shopping mall on the user's cellular telephone. In other words, the cell phone may be keeping up with the user's location. Consistent with embodiments of the present invention, a proxy device may supply location information rather than the cellular telephone.

Consistent with embodiments of the invention, the proxy device's location may be determined in a number of way. For example, the global positioning system (GPS) may be used to determine the proxy device's location. In addition, location may be determined using triangulation from cellular base stations and signal strength. The aforementioned are exemplary, and other location determining processes may be used.

An embodiment consistent with the invention comprises a system for providing a location proxy. The system comprises a memory storage for maintaining a database and a processing unit coupled to the memory storage. The processing unit is operative to associate a user device with a confining area. Furthermore, the processing unit is operative to report the location of a proxy device corresponding to the confining area as the location of the user device. In addition, the processing unit is operative to disassociate the user device from the confining area.

Another embodiment consistent with the invention comprises a system for providing a proxy service. The system comprises a memory storage for maintaining a database and a processing unit coupled to the memory storage. The processing unit is operative to determine if a first condition associated with a user device is present. The first condition may comprise one of the following: the user device being unable to determine a location of the user device and the user device being unable to communicate over a communication system associated with the user device. Furthermore, the processing unit is operative to use, if the first condition associated with the user device is present, a proxy device to perform at least one of the following: determine the location of the user device, report the location of the user device, and to allow the user device to communicate.

Consistent with an embodiment of the present invention, the aforementioned memory, processing unit, and other components are implemented in a location proxy system, such as an exemplary location proxy system 100 of FIG. 1. Any suitable combination of hardware, software, and/or firmware may be used to implement the memory, processing unit, or other components. By way of example, the memory, processing unit, or other components may be implemented with a location proxy processor 105, in combination with system 100. The aforementioned system and processor are exemplary and other systems and processors may comprise the aforementioned memory, processing unit, or other components, consistent with embodiments of the present invention.

By way of a non-limiting example, FIG. 1 illustrates system 100 in which the features and principles of the present invention may be implemented. As illustrated in the block diagram of FIG. 1, system 100 includes location proxy processor 105 (e.g. the location proxy device), a confining area 110, a user 115, a user device 120, and a radio tower 125. Confining area 110 may comprise, but is not limited to, an airplane, a bus, a boat, a ship, a vehicle, a room, a building, an apartment, a dwelling, a house, an office, a designated area, a sporting venue, or any other area, location, or vessel in which, for example, user 115 may enter and may be required not to report location information (or voluntarily does not wish to report location information). The aforementioned are exemplary and confining area 110 may comprise other elements.

Moreover, confining area 110 may comprise a location where user device 120 is not capable of reporting location information. For example, user device 120 may be located where communication coverage (e.g. cellular telephone coverage) is inadequate. For instance, an airplane normally flies above the cell towers providing adequate cellular reception. Sometimes, however, the coverage is not adequate. In addition, regarding airplanes, there are instances where laws prevent cellular telephone use because the wireless radio frequency may affect the airplane's avionic systems.

User 115 may be an individual, for example, desiring to receive location proxy service using location proxy processor 105. User 115 may also be an organization, enterprise, or any other entity having such desires. User device 120 may comprise a PDA, a cellular telephone, a two-way radio, a pager, a computer, or a consumer electronic device. The aforementioned are exemplary and user device 120 may comprise any type of device capable of reporting location information. Furthermore, radio tower 125 may comprise a cellular telephone tower configured to communicate with proxy processor 105 and/or user device 120. The aforementioned is exemplary and radio tower 125 may communicate using any wireless process or protocol and is not limited to cellular technology.

Figure 2:
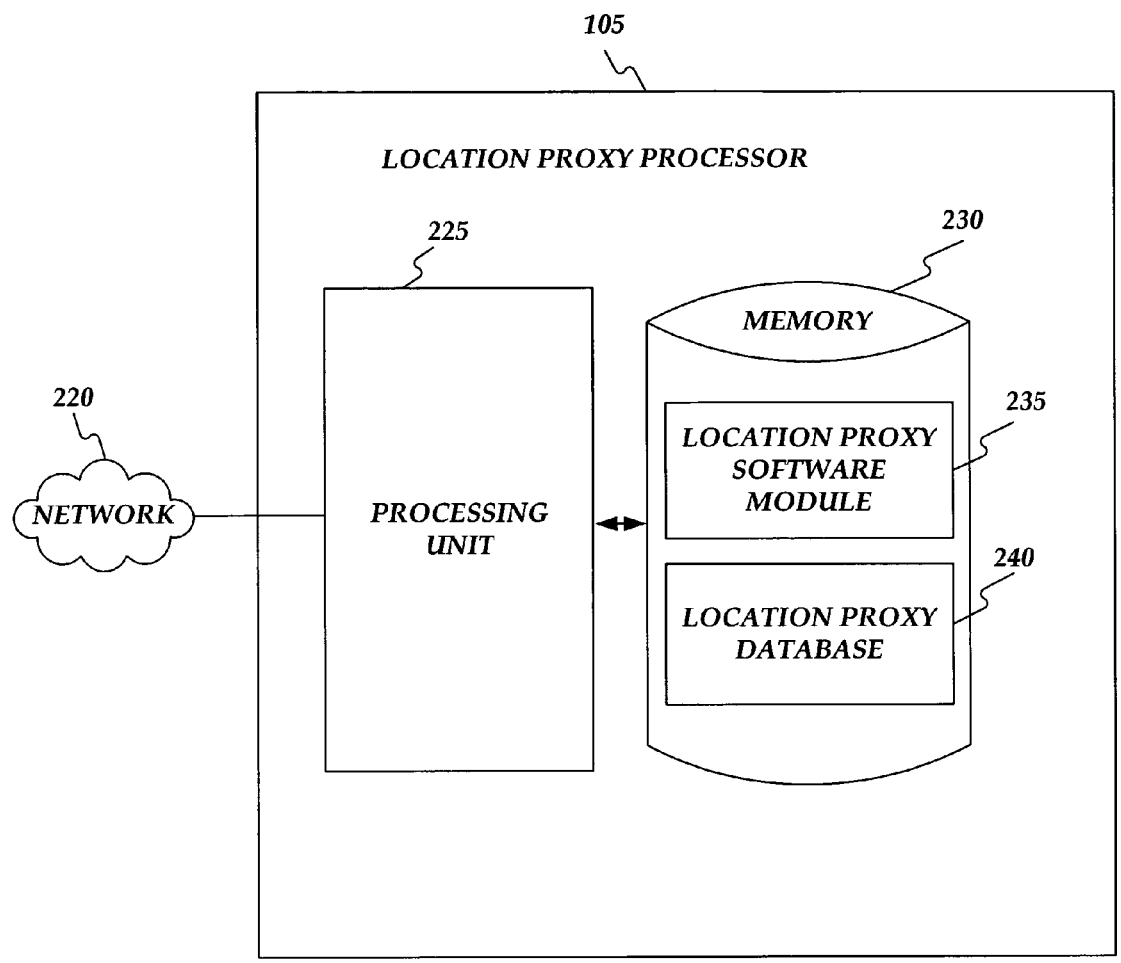
FIG. 2 is a block diagram of an exemplary location proxy processor consistent with an embodiment of the present invention.

FIG. 2 shows location proxy processor 105 of FIG. 1 in more detail. As shown in FIG. 2, location proxy processor 105 includes a processing unit 225 and a memory 230. Memory 230 includes a location proxy software module 235 and a location proxy database 240. While executing on processing unit 225, location proxy software module 235 performs processes for providing a location proxy, including, for example, one or more of the stages of method 300 described below with respect to FIG. 3.

Location proxy processor 105 ("the processor") included in system 100 may be implemented using a personal computer, network computer, mainframe, or other similar microcomputer-based workstation. The processor 105 may though comprise any type of computer operating environment, such as hand-held devices, multiprocessor systems, microprocessor-based or programmable sender electronic devices, minicomputers, mainframe computers, and the like. The processor 105 may also be practiced in distributed computing environments where tasks are performed by remote processing devices. Furthermore, the processor 105 may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor 105 may comprise other systems or devices.

Network 220 may be used to connect proxy processor 105 to radio tower 125 and/or user device 120. Network 220 may comprise, for example, a local area network (LAN) or a wide area network (WAN). Such networking environments are commonplace in offices, enterprise-wide computer networks, intranets, and the Internet. When a LAN is used as network 220, a network interface located at the processor 105 may be used to interconnect the processor 105 to the network 220. When network 220 is implemented in a WAN networking environment, such as the Internet, the processor 105 may typically include an internal or external modem (not shown) or other means for establishing communications over the WAN. Further, in utilizing network 220, data sent over network 220 may be encrypted to insure data security by using known encryption/decryption techniques.

In addition to utilizing a wire line communications system as network 220, a wireless communications system, or a combination of wire line and wireless may be utilized as network 220 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processor 105 in the wireless environment can be any mobile terminal, such as the mobile terminals described above. Wireless data may include, but is not limited to, paging, text messaging, e-mail, Internet access and other specialized data applications specifically excluding or including voice transmission. For example, the processor 105 may communicate across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802.11), a bluetooth interface, another RF communication interface, and/or an optical interface.

Figure 3:
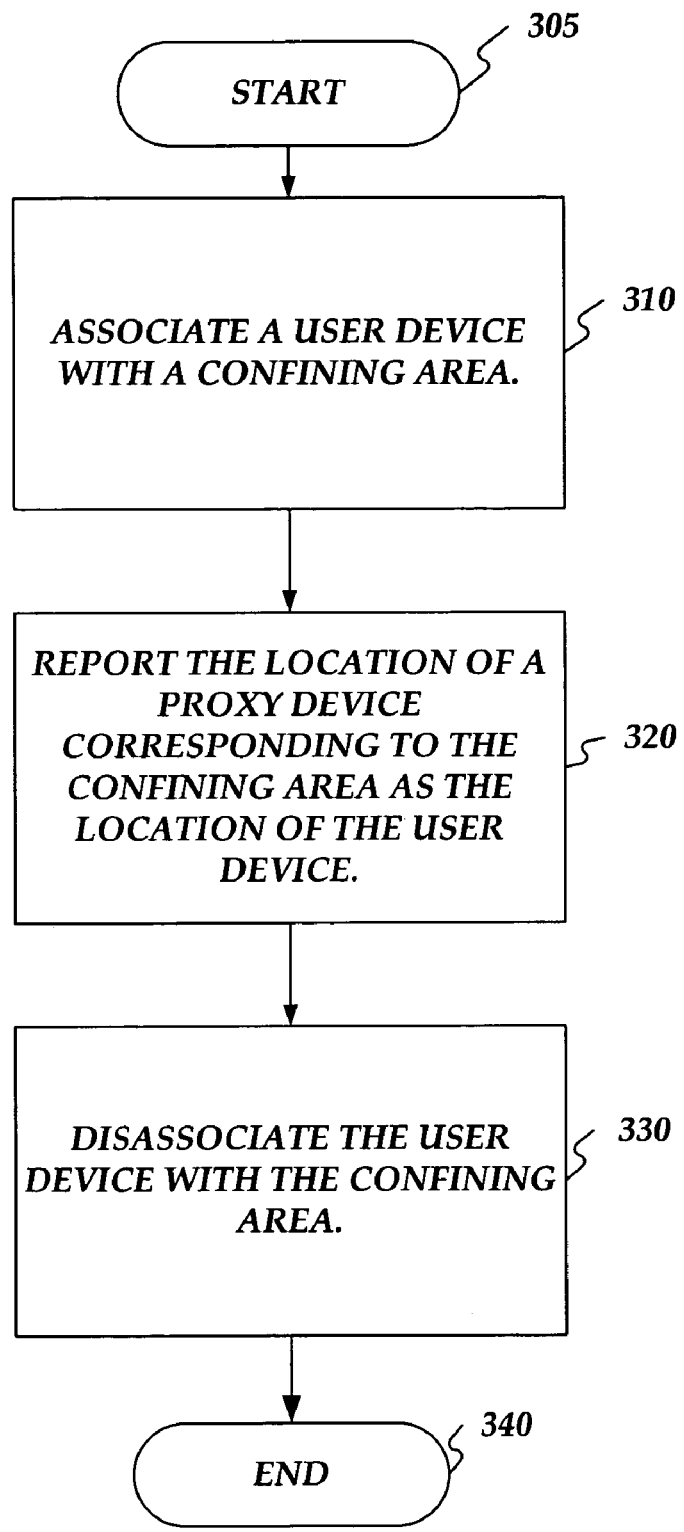
FIG. 3 is a flow chart of an exemplary method for providing a location proxy consistent with an embodiment of the present invention.

FIG. 3 is a flow chart setting forth the general stages involved in the exemplary method 300 consistent with an embodiment of the invention for providing a location proxy using system 100 of FIG. 1. Exemplary ways to implement the stages of exemplary method 300 will be described in greater detail below. Exemplary method 300 begins at starting block 305 and proceeds to stage 310 where location proxy processor 105 associates user device 120 with confining area 110 based upon an event. For example, location proxy processor 105 may associate user device 120 with confining area 110 when user 115 enters confining area 110 and confining area 110 reaches a certain altitude, barometric pressure, or when a door on confining area 110 shuts. Specifically, any of these could be applied when confining area 110 comprises an airplane, for example. Moreover, location proxy processor 105 may associate user device 120 with confining area 110 when user device 120 passes through a gate (not shown). For example, user 115 may pass though a gate on the way into confining area 110. The gate may be configured to read identification information from user device 120. The gate may be further configured to transmit the identification information to location proxy processor 105 over network 120.

Furthermore, location proxy processor 105 may associates user device 120 with confining area 110 when location proxy processor 105 receives a user-initiated input associating user device 120 with confining area 110. For example, location proxy processor 105 may be configured to receive input from user 115. The input may comprise data including identification information associated with user device 120. Alternately, confining area 110 may be configured with "cradle" type devices configured to connect to user device 120 in order for user device 120 to provide identification information to location proxy processor 105 once connected. The connection may be wired or wireless and may utilize network 220. In addition, location proxy processor 105 may associate user device 120 with confining area 110 when a ticket associated with user 115 is scanned prior to user 115 entering confining area 110. The aforementioned are exemplary and location proxy processor 115 may associate user device 115 based upon other events.

From stage 310, where location proxy processor 105 associates user device 120 with confining area 110, exemplary method 300 advances to stage 320 where location proxy processor 105 reports the location of a proxy device (e.g. location proxy processor 105) corresponding to confining area 110 as the location of user device 120. For example, location proxy processor 105 may be in motion and may report location proxy processor's 105 location as the location for user device 120 or as the location for user 115. For example, location proxy processor 105 may report location proxy processor's 105 location through radio tower 125. Moreover, location proxy processor 105 may report location proxy processor's 105 location on a periodic basis. For example, location proxy processor 105 may report location proxy processor's 105 location every minute, every hour, every day, or based on the relative movement of confining area 110. In other words, it may report location when confining area 110 moves 1000 feet, for example. The aforementioned are exemplary, and any time period or distance may be used.

Once location proxy processor 105 reports the location of the proxy device corresponding to confining area 110 as the location of user device 120 in stage 320, exemplary method 300 continues to stage 330 where location proxy processor 105 disassociates user device 120 from confining area 110. For example, location proxy processor 105 may disassociate user device 120 from confining area 110 based on any of the events (or the reverse of any of the events) described above with respect to stage 310. Events disassociating user device 120 from confining area 110 may comprise, but are not limited to: an altitude of confining area 110; a barometric pressure of confining area 110; a door opening associated with confining area 110; user device 120 passing through a gate; receiving user initiated input disassociating user device 120 from confining area 110; and scanning a ticket upon user 115 leaving confining area 110. The aforementioned are exemplary and location proxy processor 105 may disassociate user device 120 from confining area 110 based upon other events. After location proxy processor 105 disassociates user device 120 from confining area 110 in stage 330, exemplary method 300 then ends at stage 340.

Figure 4:
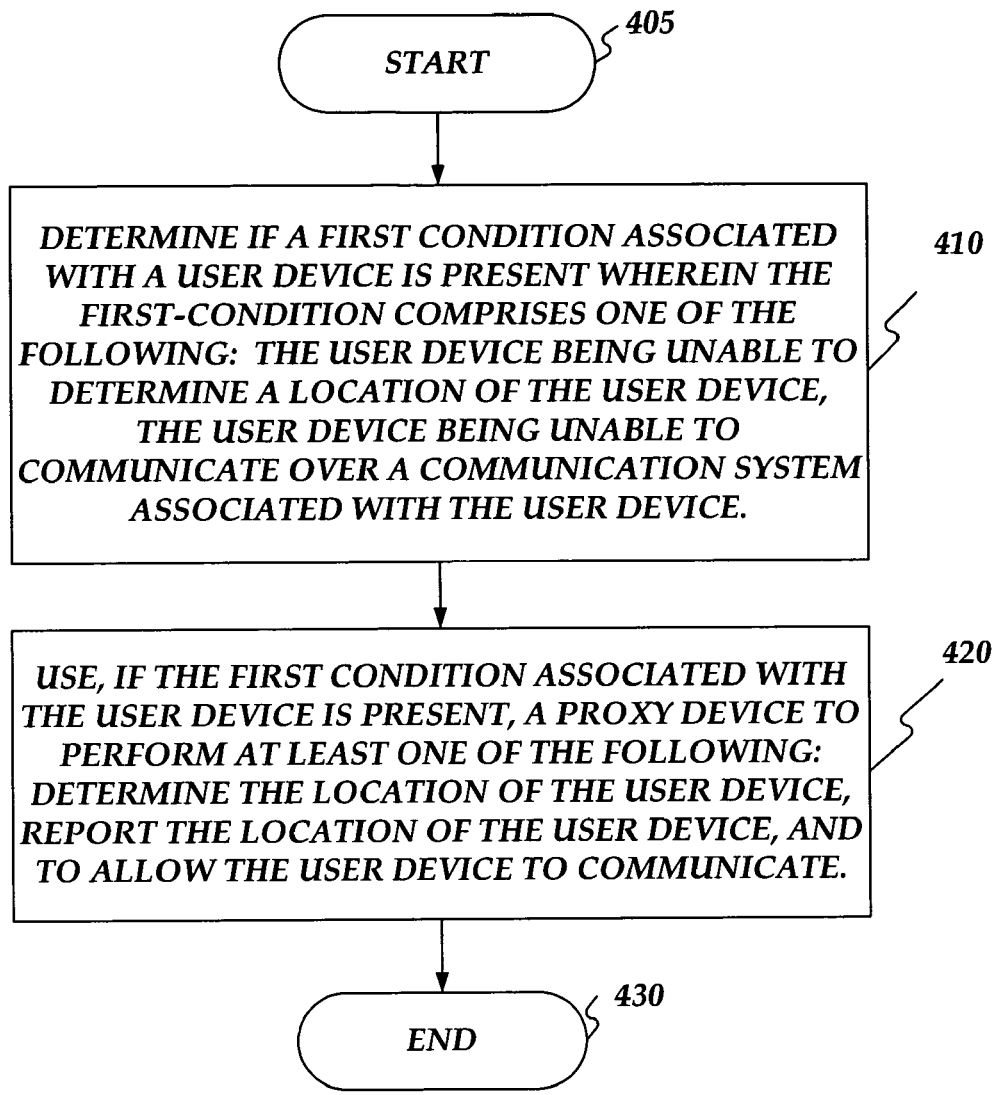
FIG. 4 is a flow chart of another exemplary method for providing a location proxy service consistent with an embodiment of the present invention.

FIG. 4 is a flow chart setting forth the general stages involved in an exemplary method 400 consistent with the invention for providing proxy services using system 100 of FIG. 1. Exemplary ways to implement the stages of exemplary method 400 will be described in greater detail below. Exemplary method 400 may begin at starting block 405 and proceed to stage 410 where location proxy processor 105 or user device 120 may determining if a first condition associated with user device 120 is present. The first condition may comprises user device 120 being unable to determine a location of user device 120 or user device 120 being unable to communicate over a communication system (e.g. radio tower 125) associated with user device 120. In either case, "unable" may mean for any reason user device 120 cannot determine the location of user device 120 or user device 120 cannot communicate over the communication system. For example, the user may for any reason render user device 120 unable to determine the location of user device 120 or user device 120 unable to communicate over the communication. Furthermore, user device 120 may itself be functioning properly, but conditions may be present that keep user device 120 from interfacing with other systems or networks that in turn keeps user device 120 from determining its location or keeps user device 120 from communicating over the communication. For example, physical obstructions or electrical/magnetic interference may render user device 120 "unable." Weather factors such as wind storms, hurricanes, tornados, snow storms, ice storms, magnetic storms may render user device 120 "unable." In addition, the other systems or networks my not be functioning properly thus keeping user device 120 from determining its location or keeps user device 120 from communicating over the communication system. Furthermore, by law, user device 120 may be rendered "unable" with or without the user's input or knowledge. For example, by law the user may be required to rendered user device 120 "unable." Moreover, "unable" may mean that the user device can still function, but not well or up to expectations.

Consistent with an embodiment of the invention, for example, user device 120 may be in a building and due to its location, user device 120 may not be able to communicate with the GPS system to determine user device 120's location. Moreover, user device may receive user input disabling user device 120's ability to determine its location. Similarly, user device may not be able to communicate the communication system that it was intended to communicate. For example, user device 120 may be too far from radio tower 125 or user device 120 may be obstructed from communicating with radio tower 125. Moreover, user device may receive user input disabling user device 120's ability to communicate over the communication system that it was intended to communicate. For example, a user may disable the wireless functionality of user device 120. The aforementioned are exemplary and many other conditions my result in user device 120 being unable to determine the location of user device 120 or user device 120 being unable to communicate over the communication system associated with user device 120.

From stage 410, where location proxy processor 105 or user device 120 determines if the first condition associated with user device 120 is present, exemplary method 400 may advance to stage 420 where location proxy processor 105 may determine the location of user device 120, report the location of user device 120, or allow user device 120 to communicate through location proxy processor 105. For example, if user device 120 is unable to determine its location, location proxy processor 105 may provide location proxy processor 105's location to user device 120 as a proxy for user device 120's location. Furthermore, proxy processor 105 may receive user device 120's location from user device 120. Proxy processor 105 may report the location of user device 120 or the proxy for the location of user device 120 to any system that may be capable of receiving this location information. Furthermore, user device 120 may communicate with any other system (e.g. radio tower 125) through location proxy processor 105. Once location proxy processor 105 performs the aforementioned process in stage 420, exemplary method 400 may then end at stage 430.

Moreover, location proxy processor 105 may determine the location of user device 120, report the location of user device 120, or allow user device 120 to communicate through location proxy processor 105 without the user input, knowledge, permission, or approval of a user associated with user device 120. For example, location proxy processor 105 may be located in an airplane and may communicate with passengers' user devices without the user input, knowledge, permission, or approval of any of the passengers. Furthermore, location proxy processor 105 may never report this to the user.

Applicants incorporate by reference the following: *Telegeoinformatics: Location-based Computing and Services* by Hassan A. Karimi (Editor), et al (Hardcover—Mar. 15, 2004).

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The present invention may be embodied as systems, methods, and/or computer program products. Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for providing a proxy service, the method comprising:

detecting when a user device enters a confining area;

determining, without input from a user associated with the user device, if a first condition associated with the user device is present wherein the first condition comprises the user device being unable to communicate over a communication system associated with the user device; and using, if the first condition associated with the user device is present, a proxy device to perform the following:

determining the location of the user device;

receiving the user device location from the user device, wherein receiving the user device location from the user device comprises reporting, by the user device, the user device location from the user device to the proxy device;

reporting the location of the user device to the communication system; and allowing the user device to communicate.

2. The method of claim 1, wherein the first condition is initiated by at least one of the following: an altitude of space associated with the user device; a barometric pressure of the space associated with the user device; a door shutting associated with the space associated with the user device; the user device passing through a gate; and scanning a ticket prior to a user entering the space associated with the user device.

3. The method of claim 1, wherein the first condition is initiated by associating the user device with a space associated at least one of the following: an airplane; a bus, a boat; a ship; a vehicle; a room; a building; a designated area; and a sporting venue.

4. The method of claim 1, wherein the user device comprises at least one of the following: a personal digital assistant (PDA); a cellular telephone; a two-way radio; a pager; a computer; and a consumer electronic device.

5. The method of claim 1, further comprising reporting the location of the user device when the proxy device is in motion.

6. The method of claim 1, further comprising reporting the location of the user device on a periodic basis.

7. A system for providing a proxy service, the system comprising:

means for determining if a first condition associated with a user device is present wherein the first condition comprises the user device being unable to determine a location of the user device and the user device being unable to communicate over a communication system associated with the user device; and means for using, if the first condition associated with the user device is present, a proxy device to perform the following:

receive the user device information from the user device;

report a proxy device location as the location of the user device without knowledge of a user associated with the user device;

allow the user device to communicate; and supply the proxy device location information from the proxy device to the user device.

8. The system of claim 7, wherein the first condition is initiated by at least one of the following: an altitude of a space associated with the user device; a barometric pressure of the space associated with the user device; a door shutting associated with the space associated with the user device; the user device passing through a gate; receiving user initiated input associating the user device with the proxy device; and scanning a ticket prior to the user entering the space associated with the user device.

9. The system of claim 7, wherein the first condition is initiated by associating the user device with a space associated at least one of the following: an airplane; a bus, a boat; a ship; a vehicle; a room; a building; a designated area; and a sporting venue.

10. The system of claim 7, wherein the user device comprises at least one of the following: a personal digital assistant (PDA); a cellular telephone; a two-way radio; a pager; a computer; and a consumer electronic device.

11. The system of claim 7, further comprising means for reporting the location of the user device when the proxy device is in motion.

12. The system of claim 7, further comprising means for reporting the location of the user device on a periodic basis.

13. A non-transitory computer-readable medium which stores a set of instructions which when executed performs a method for providing a proxy service, the method executed by the set of instructions comprising:

determining if a first condition associated with a user device is present wherein the first condition comprises the user device being unable to determine a location of the user device and the user device being unable to communicate over a communication system associated with the user device; and using, if the first condition associated with the user device is present, a proxy device to perform the following:

receiving the user device information from the user device;

reporting a proxy device location as the location of the user device without knowledge of a user associated with the user device;

allowing the user device to communicate; and supplying the proxy device location information to the user device, wherein using the proxy device comprises using the proxy device without at least one of the following: input from a user associated with the user device, knowledge of the user associated with the user device, permission of the user associated with the user device, and approval of the user associated with the user device.

14. The non-transitory computer-readable medium of claim 13, wherein the first condition is initiated by at least one of the following: an altitude of a space associated with the user device; a barometric pressure of the space associated with the user device; a door shutting associated with the space associated with the user device; the user device passing through a gate; receiving user initiated input associating the user device with the proxy device; and scanning a ticket prior to a user entering the space associated with the user device.

15. The non-transitory computer-readable medium of claim 13, wherein the first condition is initiated by associating the user device with a space associated at least one of the following: an airplane; a bus, a boat; a ship; a vehicle; a room; a building; a designated area; and a sporting venue.

16. The non-transitory computer-readable medium of claim 13, wherein the user device comprises at least one of the following: a personal digital assistant (PDA); a cellular telephone; a two-way radio; a pager; a computer; and a consumer electronic device.

17. The non-transitory computer-readable medium of claim 13, further comprising reporting the location of the user device when the proxy device is in motion.

18. The non-transitory computer-readable medium of claim 13, further comprising reporting the location of the user device on a periodic basis.

19. The non-transitory computer-readable medium of claim 13, further comprising discontinuing use of the proxy device when the first condition associated with the user device is no longer present.

* * * * *